Feb. 12, 1935.  A. B. WINCHELL  1,990,885
PHONOGRAPH
Filed Sept. 28, 1931  14 Sheets-Sheet 1

Inventor
Arthur B. Winchell
By his Attorney

Feb. 12, 1935.  A. B. WINCHELL  1,990,885

PHONOGRAPH

Filed Sept. 28, 1931  14 Sheets-Sheet 2

Inventor
Arthur B. Winchell
By his Attorney

Feb. 12, 1935. A. B. WINCHELL 1,990,885
PHONOGRAPH
Filed Sept. 28, 1931 14 Sheets-Sheet 3
FIG. 3
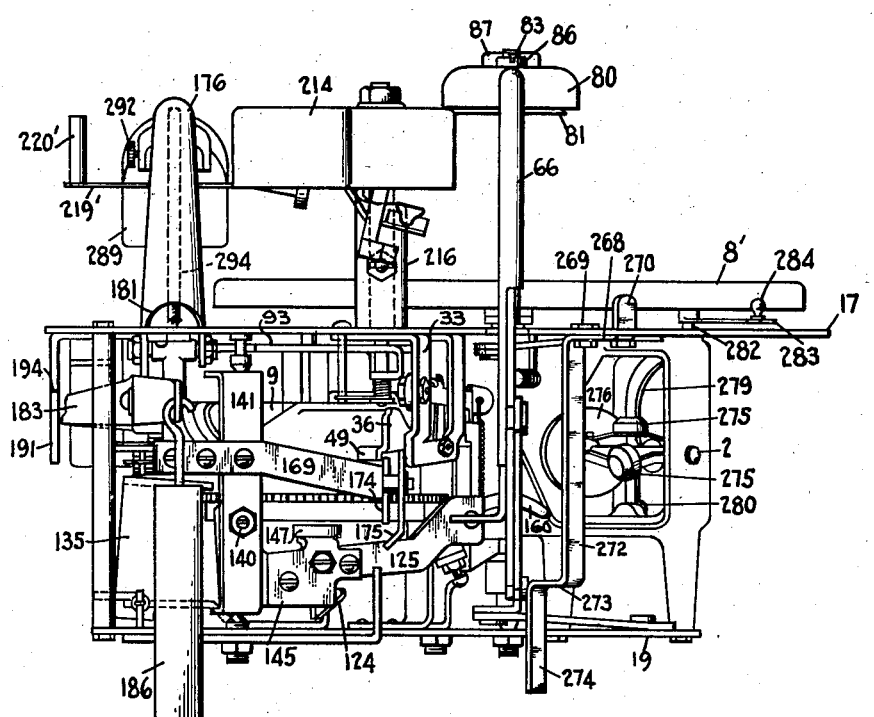
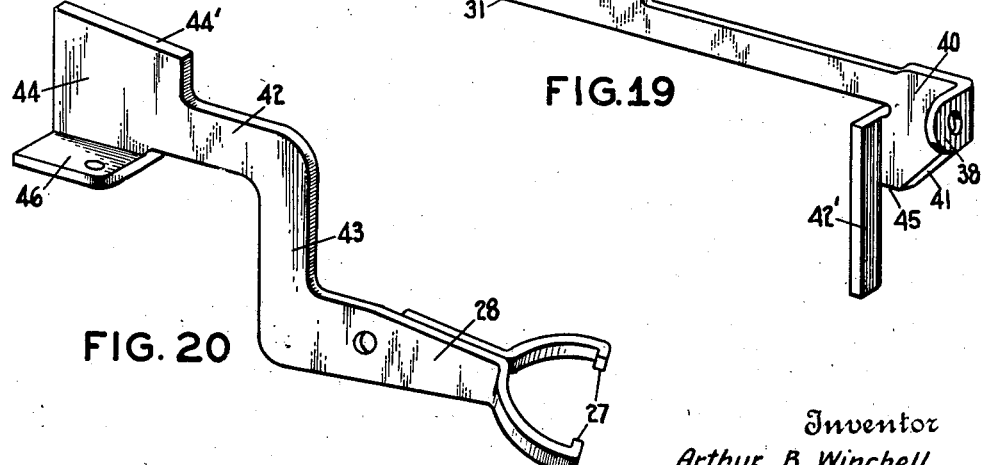
FIG. 19
FIG. 20
Inventor
Arthur B. Winchell
By his Attorney

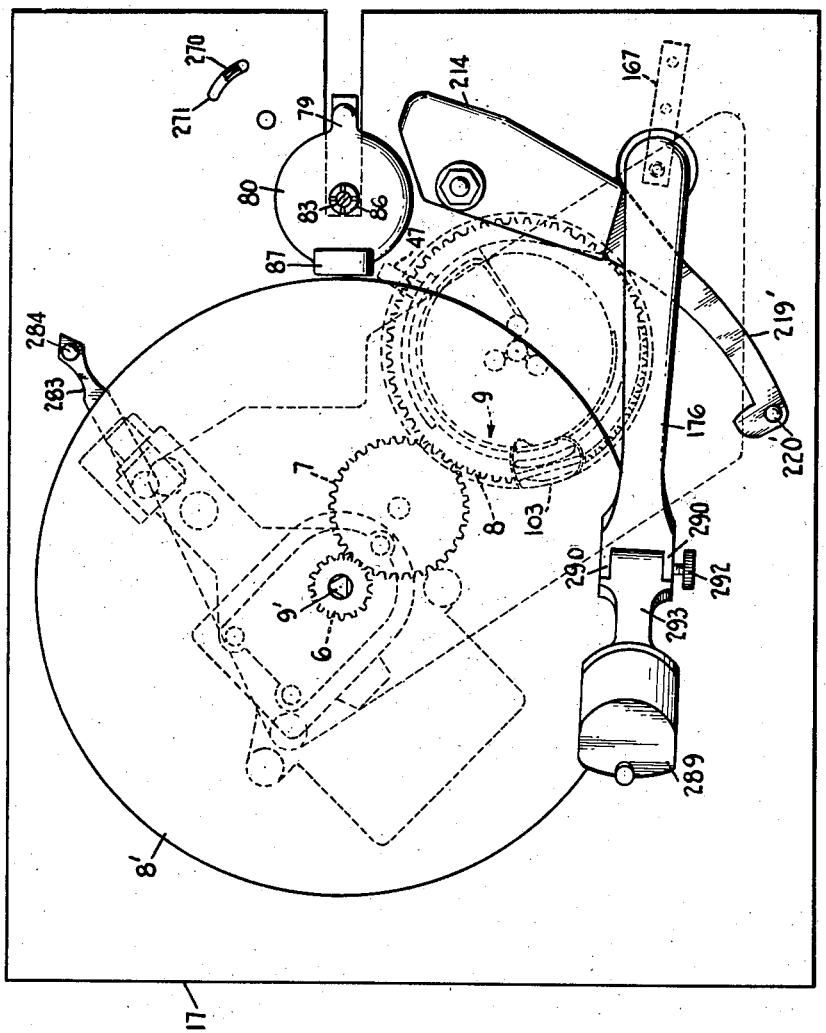

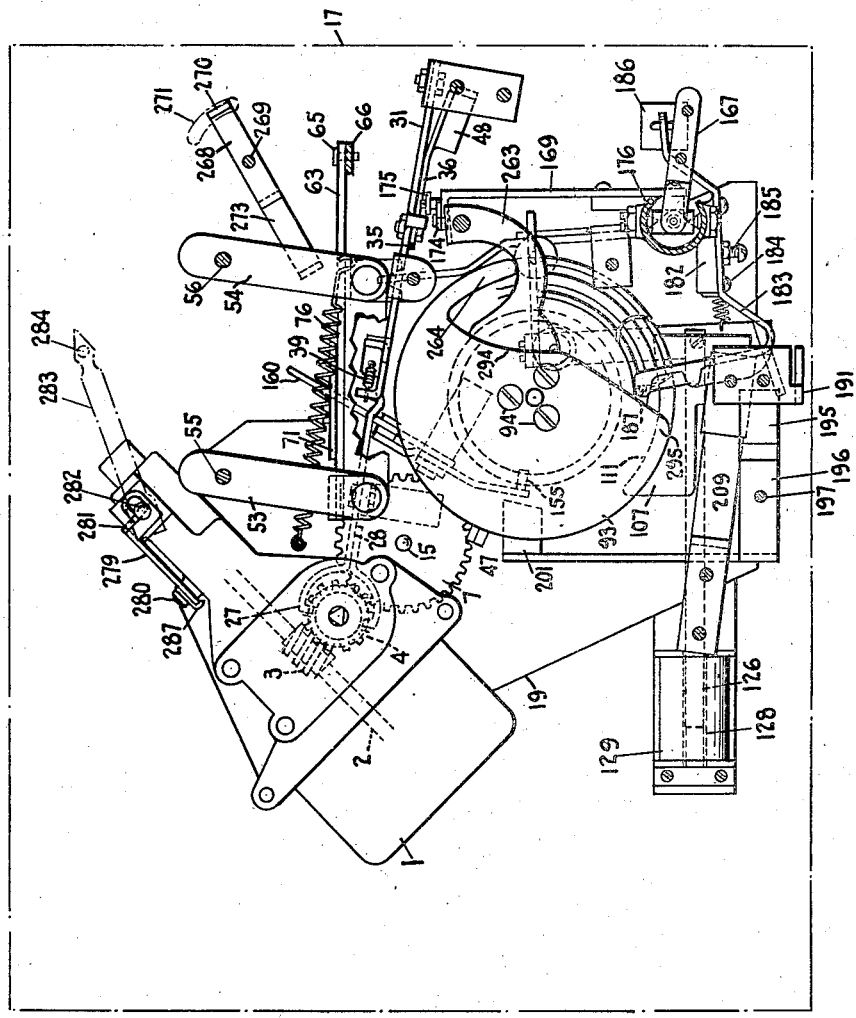

Feb. 12, 1935.　　　A. B. WINCHELL　　　1,990,885
PHONOGRAPH
Filed Sept. 28, 1931　　　14 Sheets-Sheet 6
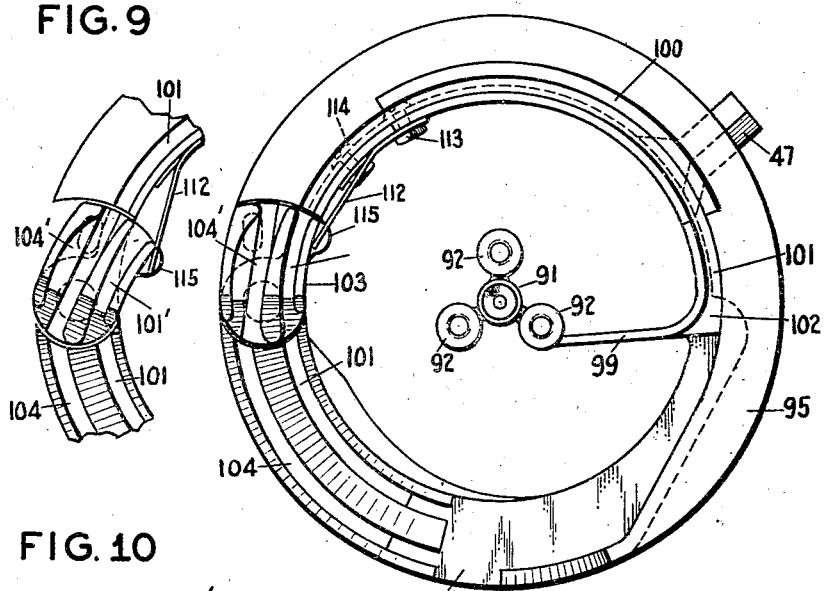
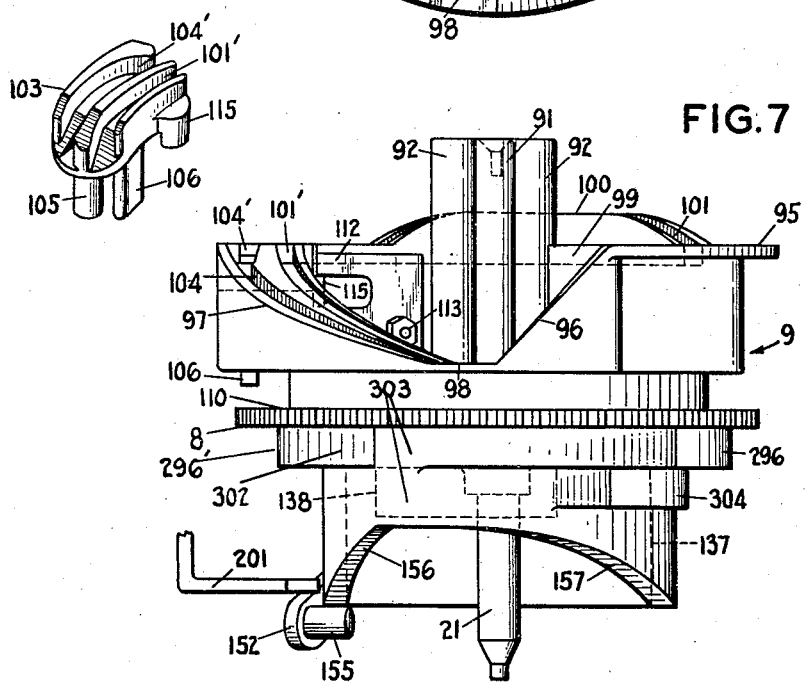
Inventor
Arthur B. Winchell
By his Attorney Feb. 12, 1935.  A. B. WINCHELL  1,990,885
PHONOGRAPH
Filed Sept. 28, 1931   14 Sheets-Sheet 8

FIG.11

INVENTOR
Arthur B. Winchell
BY HIS ATTORNEY

Feb. 12, 1935.  A. B. WINCHELL  1,990,885
PHONOGRAPH
Filed Sept. 28, 1931  14 Sheets-Sheet 9

Feb. 12, 1935.  A. B. WINCHELL  1,990,885
PHONOGRAPH
Filed Sept. 28, 1931   14 Sheets-Sheet 11

INVENTOR
Arthur B. Winchell
BY HIS ATTORNEY

Feb. 12, 1935.    A. B. WINCHELL    1,990,885
PHONOGRAPH
Filed Sept. 28, 1931    14 Sheets-Sheet 12
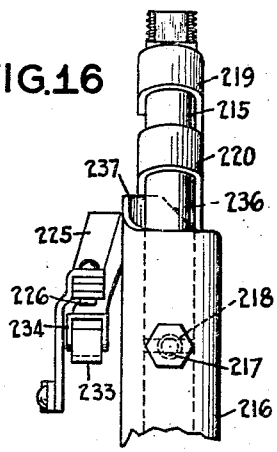
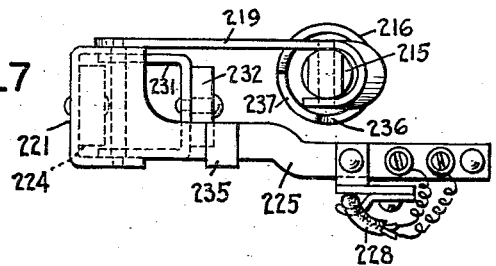
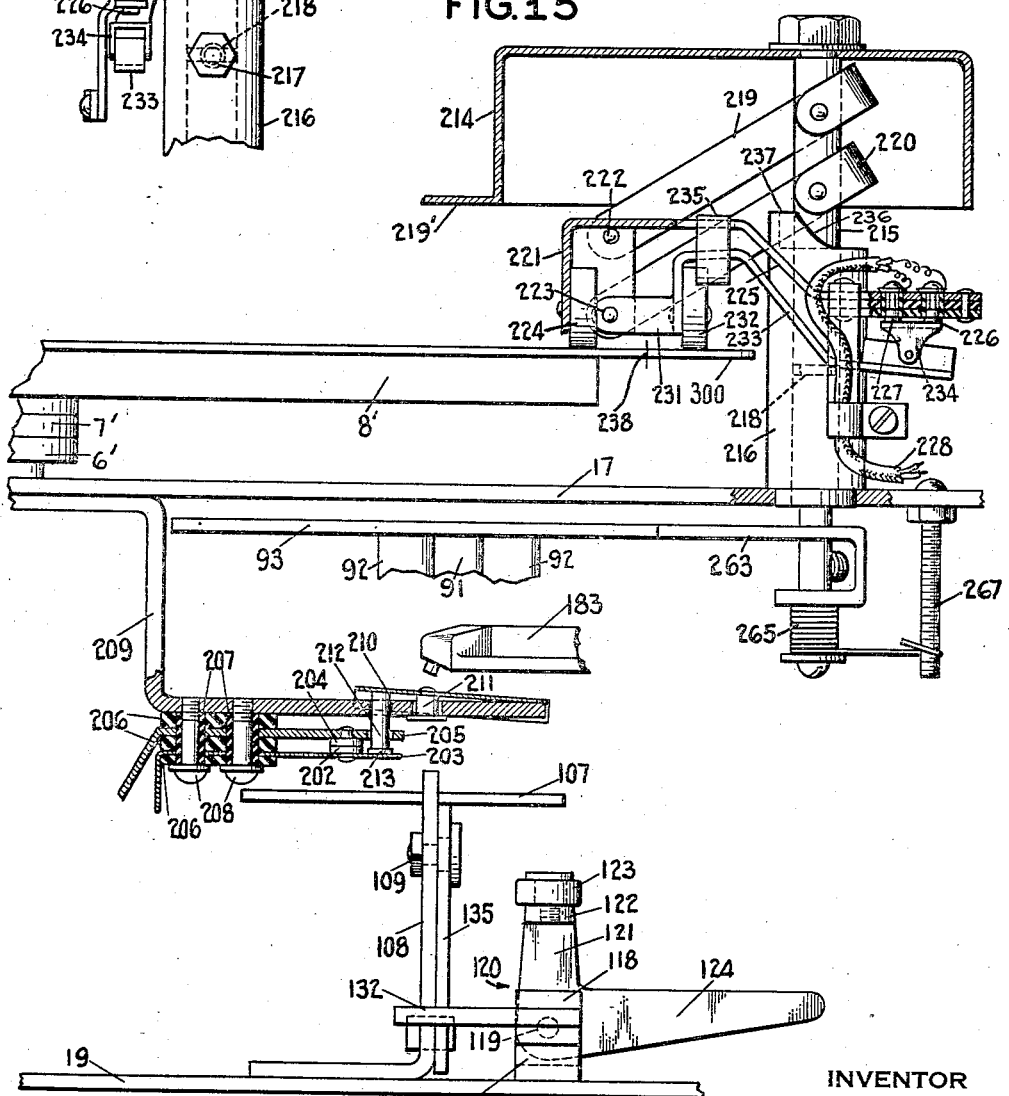
INVENTOR
Arthur B. Winchell
BY HIS ATTORNEY Feb. 12, 1935.  A. B. WINCHELL  1,990,885
PHONOGRAPH
Filed Sept. 28, 1931  14 Sheets-Sheet 13

INVENTOR
Arthur B. Winchell
BY HIS ATTORNEY

Feb. 12, 1935. A. B. WINCHELL 1,990,885
PHONOGRAPH
Filed Sept. 28, 1931 14 Sheets-Sheet 14
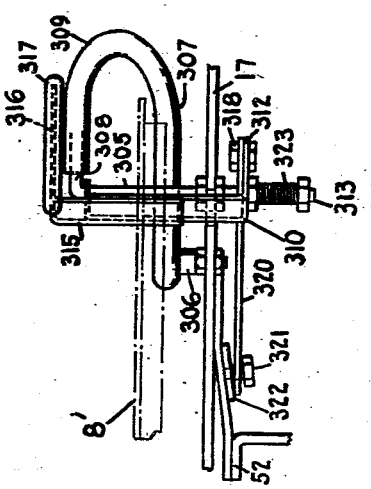
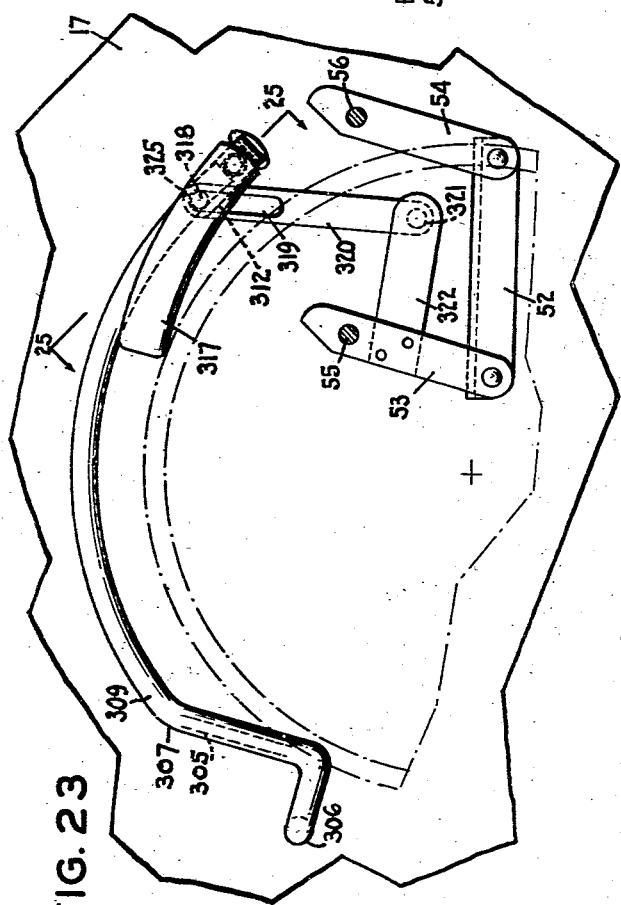
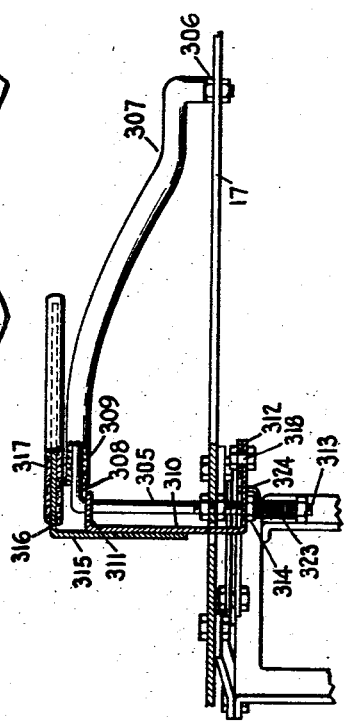
INVENTOR
Arthur B. Winchell
BY HIS ATTORNEY Patented Feb. 12, 1935

1,990,885

UNITED STATES PATENT OFFICE 1,990,885

PHONOGRAPH

Arthur B. Winchell, Jackson, Mich., assignor, by mesne assignments, to Radio Corporation of America, New York, N. Y., a corporation of Delaware Application September 28, 1931, Serial No. 565,468

36 Claims. (Cl. 274—10)

This application relates to phonographs and while illustrated in connection with phonographs of the electric type, the principles may be embodied in a mechanical form of phonograph.

One of the objects of the invention is to design a phonograph so that it will play continuously a plurality of records and automatically change from one to the other in succession.

Another object of the invention is to decrease the required time for the automatic change from one record to another.

Another object of the invention is to simplify the parts and reduce the cost of the apparatus.

Other objects of the invention will appear in the following description, reference being had to the drawings in which:

Fig. 3 is an elevation of the apparatus as viewed from the rear.

Fig. 4 is a plan view of the apparatus.

Fig. 5 is a plan view of the apparatus with the turntable and certain other parts removed to show the construction of the parts hidden from view in Fig. 4.

Fig. 6 is a top view of the cam, the switch being in position for playing small size records.

Fig. 7 is an elevation of the cam.

Fig. 9 is a plan view of a portion of the cam shown in Fig. 6 with the switch moved to the position required for large size records.

Fig. 10 is a perspective view of the track switch.

Fig. 11 is an elevation, partly in section, showing the clutch mechanism.

Fig. 15 is an elevation of the indicator which brings about the proper setting of the pick-up arm and discard mechanism for the record that is next to be played, certain parts being in section, the indicator mechanism being in lowered position on a large size record.

Fig. 16 is an end view of the indicator apparatus shown in Fig. 14 with certain parts removed, the mechanism being shown in lowered position.

Fig. 17 is a plan of the mechanism shown in Fig. 16.

Fig. 19 is a perspective view of the throw-out lever.

Fig. 20 is a perspective view of the clutch lever.

Fig. 23 is a plan view of the discard rod used in a modification.

Fig. 24 is an end view of the parts shown in Fig. 23.

Fig. 25 is a cross section taken on lines 25—25 of Fig. 23.

Figure 1:
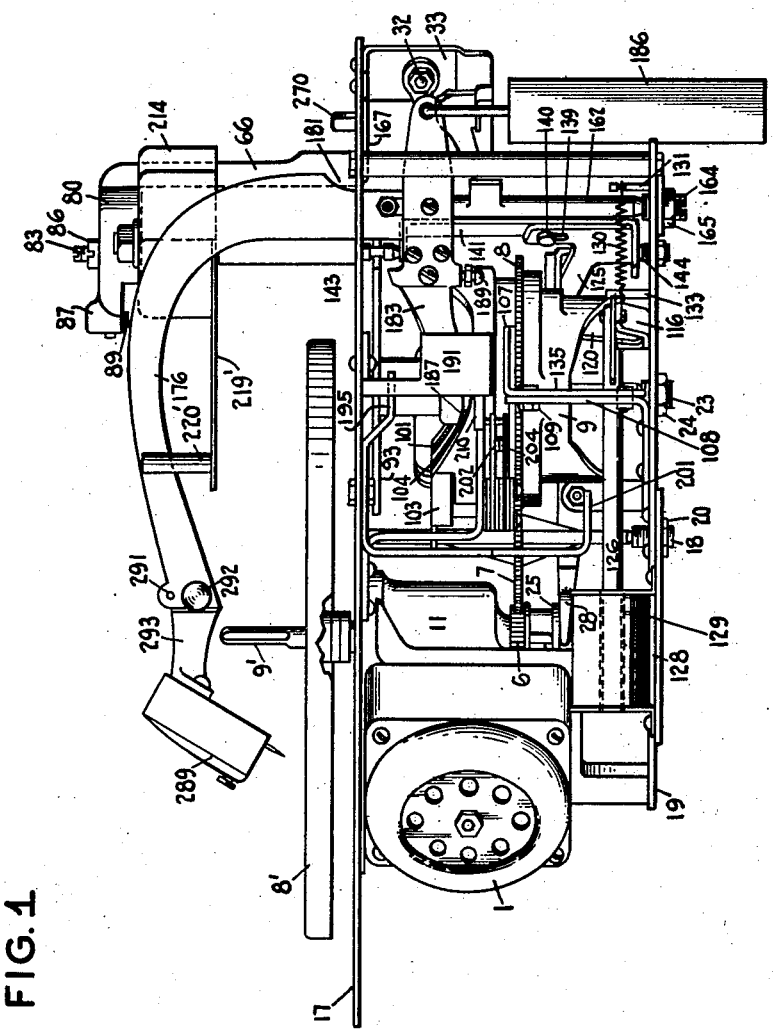
Fig. 1 is a side elevation of the mechanism of the phonograph.

Referring to Fig. 1, the motive power for the phonograph is furnished by electric motor 1 having a shaft 2 on which is machined a worm 3 meshing with worm gear 4 keyed to turntable shaft 5 (Figs. 5 and 11). On shaft 5 is a loosely journalled clutch gear 6 meshing with idler gear 7 which in turn meshes with the gear 8 on the main cam 9.

The turntable shaft 5 is journalled at 10 in the gear housing 11 and at the lower end by ball step bearing 12 resting on the adjusting screw 13, having a lock nut 14 for positioning the turntable shaft. The turntable shaft 5 has a flange 6' supporting a friction washer 7' preferably made of rubber. The turntable 8' rests on this washer and is rotated entirely by frictional engagement with the washer. The turntable can therefore be taken off without the use of any tools. Threaded in the shaft 5 is a record spindle 9'. This pin is preferably triangular in shape at the free end to facilitate the discarding and placing of records thereon.

The idler 7 is rigidly fastened to shaft 15 engaging at its upper end with conical bearing pin 16 in the main supporting plate 17, and at its lower end with conical adjusting screw 18 in the lower plate 19. The lock nut 20 holds the adjustment when once made.

The cam 9 is rigidly secured to shaft 21 which has at its upper end a conical socket fitting over cone 22 in the plate 17. The lower end of the shaft 21 has a conical bearing fitting into the adjusting screw 23 threaded into plate 19. The lock nut 24 holds the adjustment when once made.

Splined on turntable shaft 5 is the movable clutch member 25. This clutch has a square groove 26 in which fits the prongs 27 (Fig. 11) on clutch lever 28 pivoted at 29 in bracket 30, riveted or otherwise secured to bottom plate 19. Pin 27' in shaft 5 fits in a slot in the clutch member 25 to permit it to move longitudinally of the shaft but forcing it to rotate with the shaft.

Figure 2:
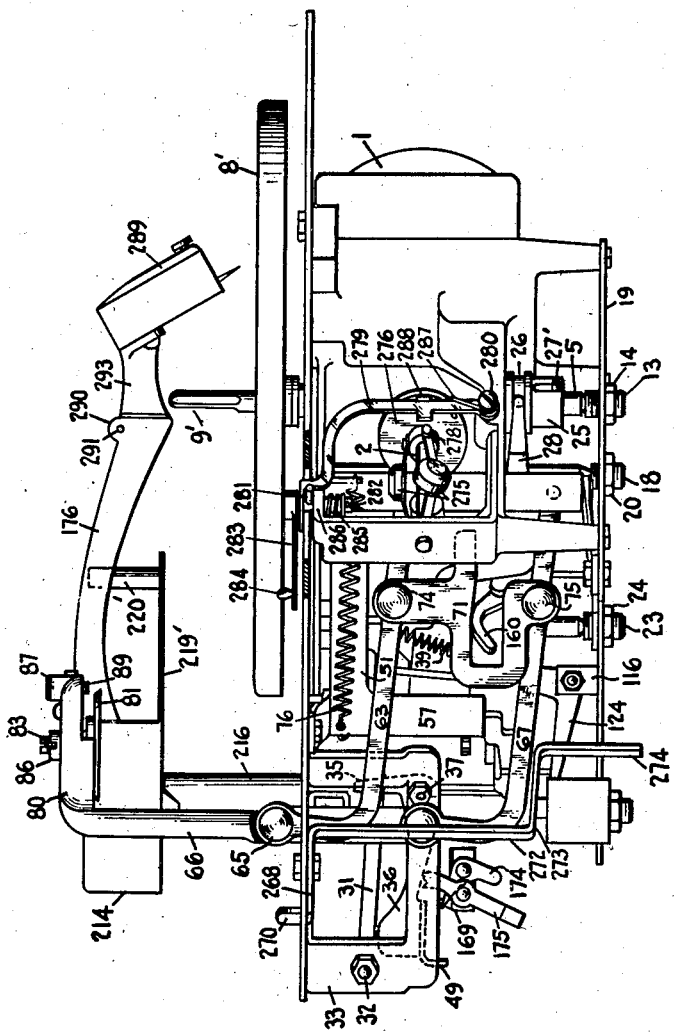
Fig. 2 is an elevation of the apparatus as viewed from the opposite side.
Figure 8:
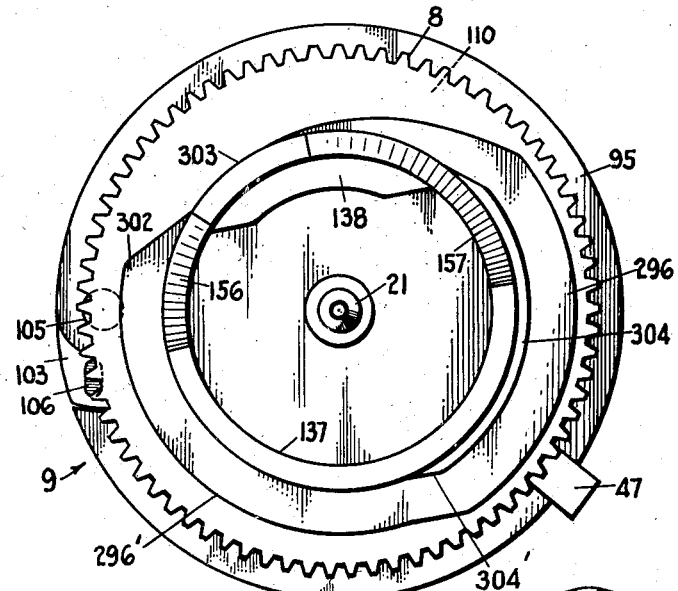
Fig. 8 is a bottom view of the cam.
Figure 12:
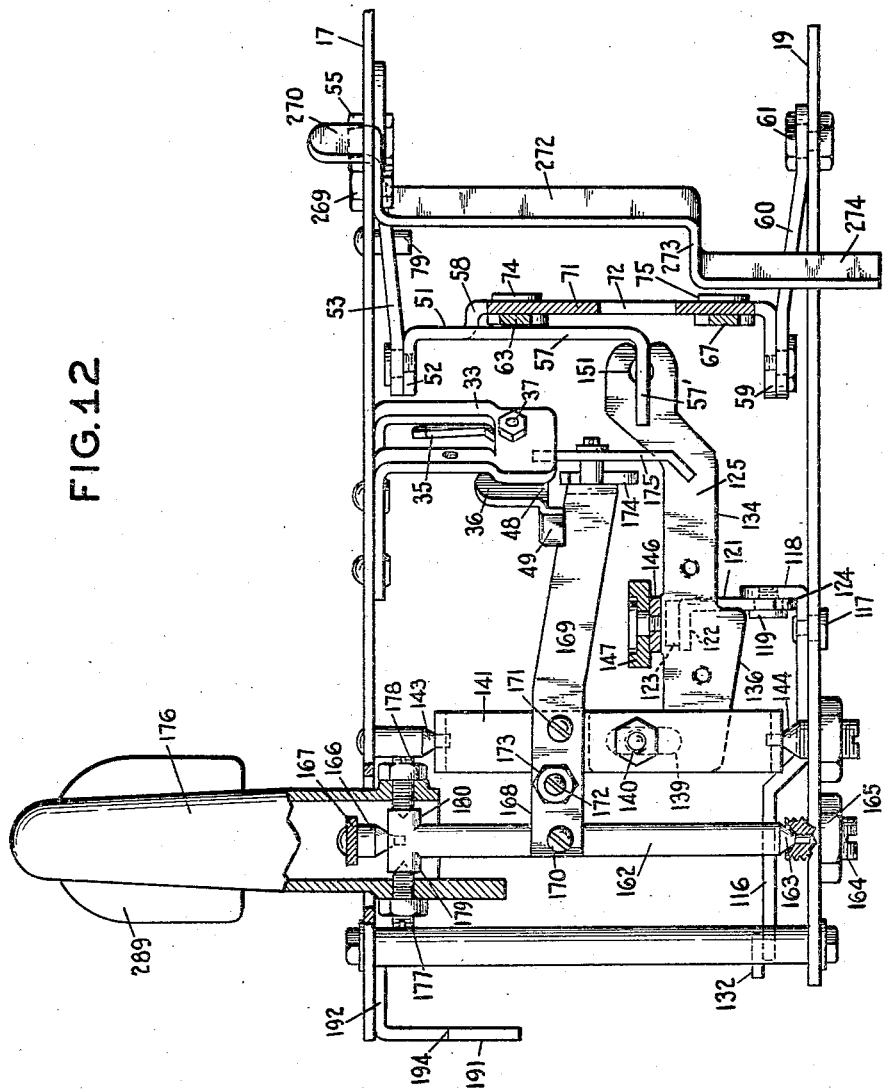
Fig. 12 is a rear view of the phonograph with certain parts omitted and other parts in section.

Thow-out lever 31 is pivoted at 32 in bracket 33 which is broken away in Fig. 11 but is shown in Figs. 2 and 12.

Thow-out lever 31 has a bent over catch 34 adapted to engage the notch in detent 35 of the trip lever 36 pivoted at 37 near the right-hand standard of the U-shaped bracket 33. The free end of the throw-out lever 31 is bent in an opposite direction from the catch 34 to form ear 38 (Fig. 19) serving as an attachment for one end of the spring 39. Depending from the free end of the throw-out lever 31 is a projection 40 which has a slanting edge surface 41. The projection has standard 42' bent at right angles thereto.

The clutch lever 28 extends upward at 43 and then at right angles at 42. The free end of this clutch lever has a head 44, the upper edge 44' of which is adapted to engage the edge 45 of projection 40. The head 44 has the bottom portion bent at right angles to form a ledge 46 (Fig. 20). This ledge serves as means for fastening the lower end of spring 39 and also serves as a stop to be engaged by the extension 42' on the throw-out lever 31.

Back of the throw-out lever in Fig. 11 is located cam 9. This cam has a projection 47 (Fig. 6) which is adapted to ride between the slanting surface 41 and 44' once each revolution of the cam. As this projection rides between these two levers it forces the throw-out lever 31 upwardly against the tension of spring 39 for a purpose to be referred to later in describing the operation of the machine.

The trip lever 36 has a ledge 48 bent at right angles to the main portion of the lever (Figs. 2 and 11). The ledge is bent downwardly at 49 to serve as a stop for the part to be later referred to. The under surface of the ledge 48 is grooved at 50 for engagement with the trip dog to be later described.

Figure 21:
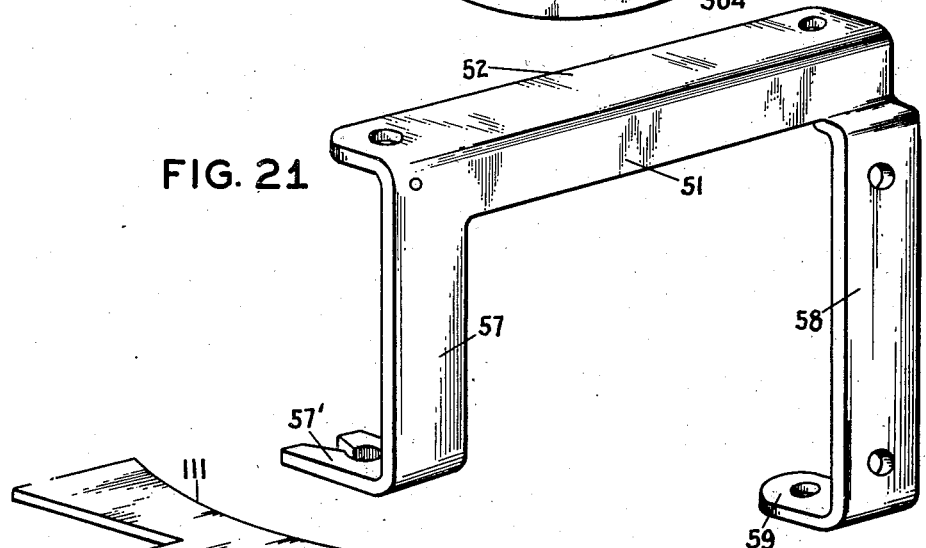
Fig. 21 is a perspective of the link yoke of the discard mechanism.
Figure 22:
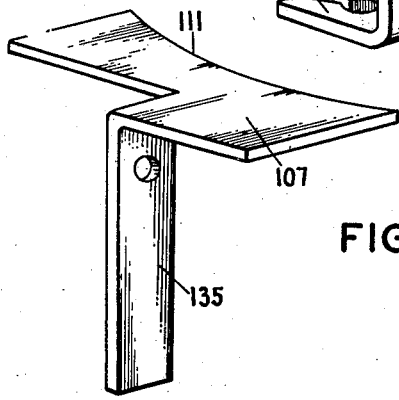
Fig. 22 is a perspective view of the track-switch cam.
Figure 13:
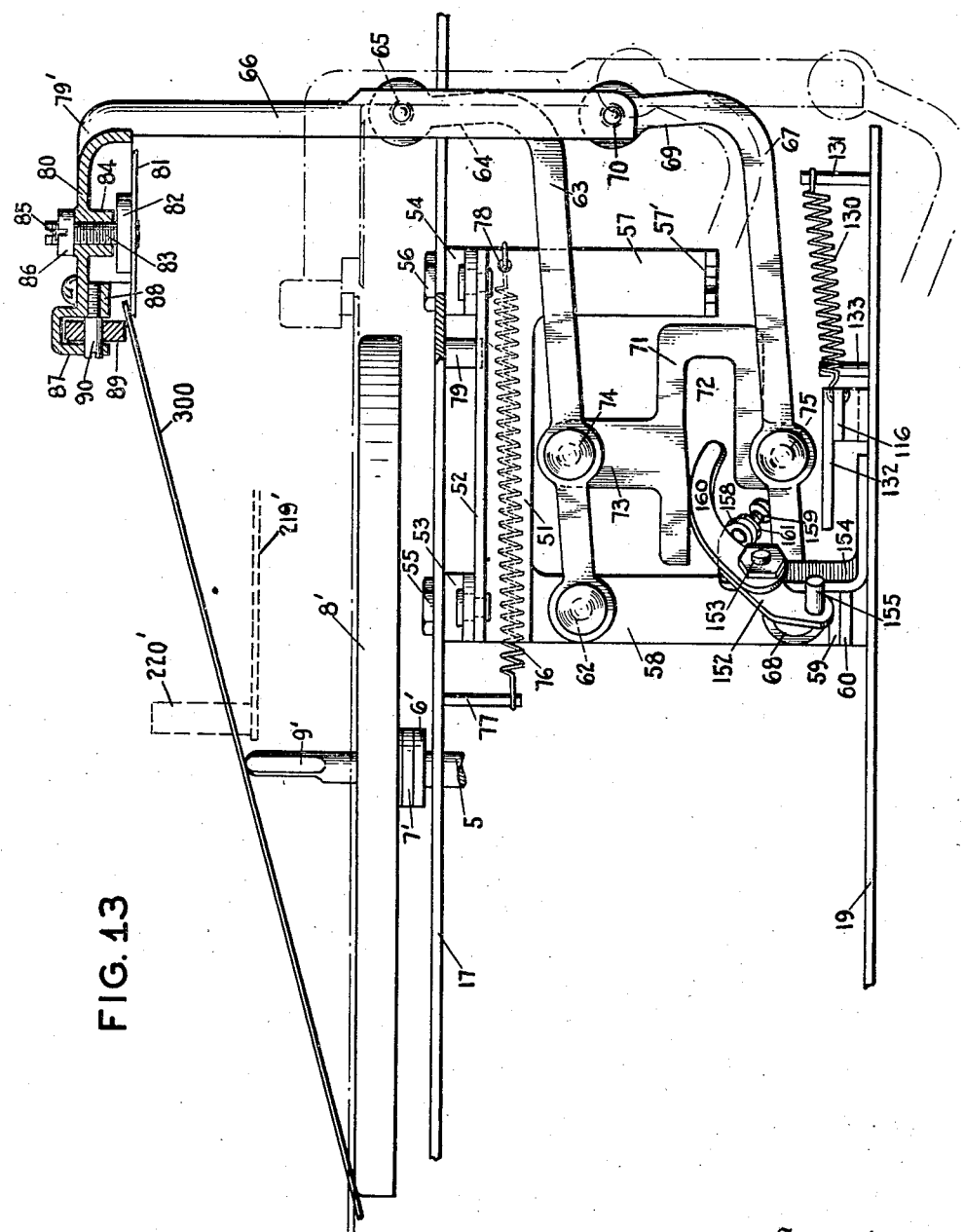
Fig. 13 is an elevation, certain parts being in section, illustrating the record changing mechanism.

The discard mechanism is supported on a bracket or link yoke 51 (Figs. 12 and 13). The yoke has a top 52 bent horizontally and having a hole in each end in which is pivoted arms 53 and 54. These arms are pivoted at 55 and 56 to the supporting plate 17. Yoke 51 has a depending leg 57, the end of which is bent at right angles to form an ear 57' serving as one part of a universal joint to be later described and a longer depending leg 58, the latter being bent to one side to form a projection 59 (Figs. 12 and 21). In this projection is pivoted a third arm 60 which is pivoted at 61 to the bottom plate 19. With this construction it will be seen that the yoke is supported by the three arms 53, 54 and 60 in such a way as to have parallel motion.

To the leg 58 is pivoted at 62 a link 63 which has an upturned end 64 (Fig. 13) pivoted at 65 to the discard standard 66. Similar link 67 is pivoted at 68 to the long leg 58 of the yoke 51. The upturned end 69 of this link is pivoted at 70 to the lower end of the discard standard 66. A shoe 71 has a U-shaped body portion forming a slot 72; one leg of this U-shaped body has an ear 73 pivoted at 74 to the link 63. The shorter leg of the U-shaped body has an ear pivoted at 75 to the link 67. A spring 76 is fastened at one end to a post 77 secured in the plate 17. The other end of the spring is attached at 78 to the leg 57 of the yoke 51. The tendency of this spring is to retain the yoke 51 inwardly with the upper arm 54 in contact with a post 79 in the upper plate 17 (Fig. 13). The top of the discard standard 66 extends inwardly towards the center of the record at 79' where it is formed into a more or less circularly shaped head 80 (Fig. 13). This circular head has a circular disk 81 with beveled edge secured to a small disk 82. The disks 81 and 82 are fastened to a shaft 83 threaded in a boss 84 in the inside of the head 80. This shaft has means such as notch 85 for adjusting the shaft and disks in the head 80. When the proper adjustment is obtained lock nut 86 retains the adjustment. The head 80 at the front part has two spaced ears 87 and 88 between which a small roller 89 is mounted on a stub shaft 90 extending through the ear 87 and threaded into the ear 88. The adjustment of the shaft 83 is made so that when the roller 89 is lowered onto the record the disk 81 is in position to pass under the record.

The cam 9 (Fig. 7) is the mechanism for moving the pick-up arm and the discard mechanism. This cam has a center shaft 21 already described. The upper part of the shaft has a hub 91 joined by webs to posts 92. Posts 92 have threaded holes so that the top cam disk 93 may be fastened thereto by three screws 94 (Fig. 5). The upper part of the main cam 9 has a flange 95 radial to the shaft 21. This flange slopes downwardly at 96 and 97 to the notched portion 98. A web 99 joins the upper part of the body of the cam with one of the posts 92. Substantially opposite the notch 98 and on top of the flange 95 is located a ridge 100. A groove 101 in the flange 95 extends from the point 102 through the ridge 100 to the track switch 103. Beyond the track switch the groove 101 extends down the incline 97 to the notch 98. A second groove 104 extends from the track switch to the bottom of the notch 98. The track switch 103 has a groove 101' and a second groove 104' (Fig. 9). In the bottom of the track switch is a stub shaft 105 fitting into a bearing in the main cam 9, so that the switch can be rotated to bridge the gap in the groove 101 by means of groove 101' or to connect the groove 101 with the groove 104 through groove 104'. Also on the bottom of the cam switch and near the outside thereof is a projection 106 adapted to be engaged by cam lever 107 (Fig. 15). This cam lever is pivoted to a bracket 108 by means of bolt 109 and is retained by gravity against the flange 110 which constitutes the gear 8. When the cam lever is in this position the curved portion 111 is below the lower end of the standard 106 but when it is raised upward by means later described, this curved surface lies directly in the path of the standard 106 so that as the cam rotates from right to left in Fig. 7, the standard engages the curbed edge 111 and the track switch is forced clockwise about its pivot 105 to connect the first part of the groove 101 with the groove 104' (Fig. 9). This movement puts tension on spring 112 fastened to the inside of the cam 9 by appropriate screws or bolts 113, 114. When the cam lever 107 again drops down by gravity or when the standard 106 passes beyond the end of the curved edge 111 this spring forces the track switch counterclockwise to its normal position where the groove 101' connects the two parts of groove 101.

The spring 112 fits above a lug 115 of the cam switch and thus serves two purposes; first, to maintain the groove 101 continuous, and also to hold the track switch within its seat. To remove the track switch all that is necessary is to pull outwards on the spring 112 so as to clear the lug 115. The track switch can then be lifted bodily from the cam and it can be reassembled by reversing the procedure.

Beneath the cam 9 (Figs. 12 and 14) is located shift lever arm 116 pivoted to the bottom plate 19 at 117. This shift lever has a short upstanding ear 118 to which is pivoted at 119 a bell crank 120. The arm 121 of this bell crank extends vertically and is bent horizontally at 122. On this portion 122 is journalled a small roller 123. The other end of the bell crank 124 extends beneath the cam and under roller arm 125.

To the free end of shift lever arm 116 is fastened the armature rod 126 by pin 127. This armature rod extends into the insulation tube 128 on which the wire is wound to form a solenoid 129. Spring 130 has one end fastened to the free end of lever 116 and the other end fastened to the bottom plate 19 by post 131. At the outermost end of lever 116 is located bar 132. When the solenoid is deenergized the spring 130 maintains arm 116 against post 133 secured in the bottom plate 19. In this position the bell crank arm 124 is maintained beneath the edge 134 of the roller arm 125. Also at this time the bar 132 is moved free of the projecting arm 135 of the cam arm 107 (see also Figs. 5 and 15). In this position the cam arm 107 is held below the track switch standard 106 by force of gravity.

When the solenoid 129 is energized lever 116 is pulled against tension of spring 130 and bell crank end 124 is moved beneath the edge 136 of roller arm 125. The bar 132 engages 135 and moves the switch cam lever 107 so as to bring the cam edge 111 into position to be engaged by the track switch standard 106 as the main cam 9 is rotated.

The pivot point 117 of lever 116 is substantially coaxial with the center of roller 123; therefore the position of this roller remains unchanged throughout the movement of the lever arm 116. The gravity pull on the bell crank arm 124 maintains this roller 123 on the inner surface 137 of the main cam 9 where it will engage once each revolution with the inner cam surface 138. When this roller 123 engages cam surface 138 the bell crank 120 is turned about its axis 119 and the end 124 is moved upwardly. If the solenoid is deenergized when this happens this bell crank end will not engage the roller arm 125 as it does not move to contact with the edge 134. If the solenoid is energized movement of the bell crank end 120 will cause the arm 124 to engage the edge 136 and raise roller arm 125, as later described.

The arm 125 has a slot 139 through which passes a pivot bolt 140 that fastens it to the swivel yoke 141. This yoke has upper and lower ears pivoted at 143 and 144 to the lower plate 19 and the upper plate 17 respectively (Fig. 12). The arm 125 has a roller plate 145 having an ear 146 projecting at right angles therefrom. On this ear is journalled roller 147. To permit of adjustment the plate 145 is held to the lever 125 by two screws 148 and 149 which thread into the lever 125 and pass losely through the plate 145 and engages the roller arm 125. By adjusting these two screws the position of the roller 147 on the arm 125 may be controlled. When adjustment is once made lock nut 150' will hold the position. The free end of roller arm 125 has a slot 151 that meshes with the slot in the ear 57' of the link yoke 51, forming a universal joint with that member. This universal joint permits the lever 125 to be raised and lowered by means of the bell crank arm 124 without binding in the connection with the link yoke 51. The universal connection also permits the roller arm 125 to move the link yoke and discard mechanism perpendicularly to the plane of the paper in Fig. 3.

Beneath the cam 9 is a lift lever 152 pivoted at 153 to standard 154 fastened to the bottom plate 19 (Fig. 13). One end of this lift lever has a pin or roller 155 extending under the cam 9 and adapted to coact with the cam edges 156 and 157 as the cam is rotated. The other end of the lift lever has an ear 158 bent at right angles to the plane of the lever. In this ear is threaded adjusting screw 159 adapted to engage and adjust the lever 160 also pivoted on bolt 153. When the adjustment of the screw is once made it may be held by the lock nut 161. The free end of the lever 160 engages the top edge of s'ot 72 in the shoe 71.

Pick-up bearing bracket 162 has a conical lower end 163 supported in a socket of an adjusting screw 164 threaded in the lower plate 19. Lock nut 165 holds the adjustment after it is made. The upper end of this bracket 162 has a conical socket fitting over the conical bearing 166 supported in a bracket 167 fastened to the upper plate 17 (Fig. 12). The bracket 162 has a projection 168 preferably integral therewith, to which is fastened pawl arm 169 by means of screws 170, 171, passing loosely through holes therein and threaded into the projection 168. A central screw 172 having a lock nut 173 is threaded through the pawl arm and abuts against the projection 168. By loosening or tightening screws 170, 171 and 172 the pawl arm 169 may be adjusted to the desired position. The end of this pawl arm 169 is bent inwardly (Figs. 2 and 5) and has thereon two studs on which are pivoted trip dogs 174 and 175 lying beneath the ledge 48 of trip lever 36. Trip dog 175 as the record is played slants away from the pivoted end of trip lever 36 and slides over the serrations 50 beneath the ledge. The other trip dog 174 entirely clears these serrations and is adapted at the end of the movement of pawl arm 169 to engage the down-turned end 49 at the extreme limit of its travel. The purposes of these dogs will be referred to when the operation is described.

Pick-up arm 176 passes through an opening in the top plate 17 with ample clearance and has pivoted screws 177 and 178 threaded through opposite sides having a conical fit with sockets in projections 179 and 180 on post 162. Lock nuts on these screws hold the adjustment when it is once properly made. The pivots 164, 166, 177 and 178 form a universal joint for the pick-up arm so that it can move in all directions. The back side of the pick-up arm 176 is slotted at 181 (Figs. 1 and 18) so that the strap 167 can pass through the opening 181 and can be fastened beneath the top plate 17 as previously described.

Figure 18:
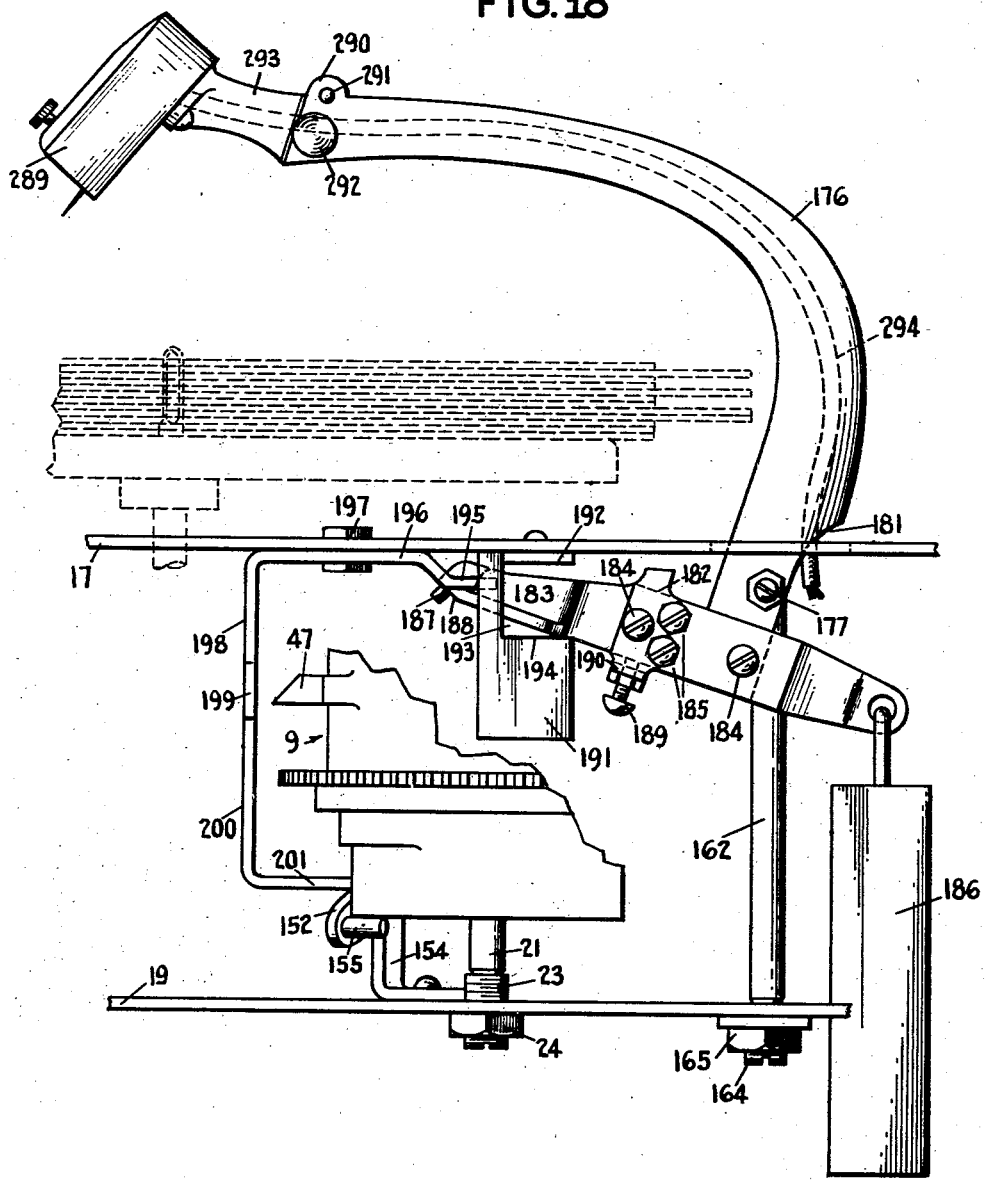
Fig. 18 is an elevation of the pick-up arm in its relation to coacting parts when the supply of records is placed on the turntable.

The lower end of the pick-up arm 176 has on one side a projection 182 to which is fastened follower arm 183 (Fig. 5). This follower arm is held to the projection on the pick-up arm by two screws 184 passing loose'y through the follower 183 and threaded into the projection. Screws 185 thread through the follower 183 and abut against the projection. By setting these screws proper adjustment of the follower can be made. On the right hand end of the follower 183 in Figs. 1 and 18 is supported a weight 186 to counterbalance the pick-up arm 176. At the other end of the follower, which is curved as shown in Fig. 5, is a depending tooth 187 adapted to fit into tracks 100 and 104. The lower part 188 of the follower 183 is adapted to rest on top of the surface 96, the cam flange 95 and the walls of the grooves.

The cam follower 183 also has an adjusting screw 189 threaded through the bottom ledge 190 and abutting against the lower end of the projection 182 on the pick-up arm 176. The screws 184 previously referred to pass loosely through the holes in the cam follower and the screw 189 adjusts the pick-up arm vertically in respect thereto.

Adjacent the left-hand end of the cam follower 183 in Fig. 18 is a supporting bracket 191 which has an end 192 bent at right angles from the position shown in Fig. 18 by which it is supported to the top plate 17. This supporting bracket 191 is notched at 193 so that the operator may lift the pick-up arm 176 and move it to the left in Fig. 3 until it rests against the lower edge 194 of the notch. In this position the cam follower and depending lug 187 will be entirely free of the cam 9 and will be unaffected by the rotating cam. This is the position in which the pick-up arm is placed when the operator is placing a supply of records on the turntable. As the pick-up arm 176 is moved to place it on the supporting edge of the bracket the follower 183 engages the end 195 of the discard holdup 196 pivoted at 197 in the top plate 17. Beyond this pivot point 197 the discard holdup extends downwardly at 198 (Figs. 14 and 18) and at right angles at 199, downwardly at 200 and at right angles thereto at 201. As the pick-up arm 176 was moved so that the cam follower 183 rested on bracket 191 engagement of the cam follower 183 with the end 195 of the holdup moved the projection 201 over the end of the lift lever 152. In this position it prevents the roller 155 on this lift lever 152 from moving in contact with the cam edges 156 and 157 (Fig. 7). When the pick-up arm 176 is removed from the seat by the operator holdup lever 196 is moved free of the lift lever 152 by projection 47 of the cam 9 engaging the horizontal portion 199. The lift lever roller can then follow the lower cam surface of cam 9.

At the left-hand side of the supporting bracket 191, as shown in Figs. 1 and 15, is located the switch in the circuit of motor 1. This switch consists of a switch contact 202 (see also Fig. 15) attached to spring strip 203 and a contact 204 attached to rigid strip 205. These two strips are spaced from each other and from other conducting parts by insulation strips 206. Insulation bushings 207 pass through holes in these strips. Screws 208 pass through these bushings and are threaded into a bracket 209 fastened to the top plate 17. The right-hand end of the bracket 209 is surrounded by a shallow trough 210 and is held in place by stud 211 passing loosely through a hole therein and riveted or otherwise fastened to the trough 210. An insulation pin 212 passes loosely through bracket 209 beneath the trough 210. This pin rests lightly upon the extension 213 of spring strip 203. The weight of the pin and trough alone is not sufficient to separate contacts 202 and 204 which are normally held together by action of the spring strips. This switch is so positioned that the under side of the cam follower 183 will not contact with trough 210 as long as there is a record on the turntable. If there is no record on the turntable the pick-up arm will descend sufficiently to bring the lower edge of follower 183 against trough 210.

In order to set the apparatus for playing either a large or a small size record and subsequently discarding the same on completion of the playing of the record, an indicator mechanism is employed (Figs. 3 and 15). This mechanism is covered by a housing 214 fastened to shaft 215 journalled in sleeve 216 secured in plate 17. The shaft is held from longitudinal movement in the sleeve by a screw 217 fitting in groove 218 in the shaft. Two arms 219, 220, are each pivoted at one end to the shaft 215 and at the other end to a housing 221 open at the bottom and at the rear. The arms are pivoted by means of cross pins 222 and 223 extending across the housing. Roller 224 journalled in the front side is adapted to engage either a small or a large size record.

A supporting arm 225 extends rearwardly and downwardly from the rear of the housing and carries two contacts 226 and 227, appropriately insulated, as shown. A two wire cable 228 connects one of these contacts to the terminal 229 of the solenoid 129 and the other to one side of the source of supply, the other side of the source being connected to the terminal 230 of the solenoid.

A saddle 231 is pivoted to the cross pin 223 and carries a roller 232 journalled in its rear side. An arm 233 is bent upwardly over the roller and then downwardly and rearwardly beneath the rear end of arm 225. Contact 234 is pivoted to and appropriately insulated from the free end of the arm 233. This contact has limited movement about its pivot to insure good contact with the contact points 226 and 227 when it is raised by roller 232 engaging a large size record. To limit the downward movement of the arm 233 a channel strap 235 is secured to the arm 225 and has one side extending under the arm 233.

The sleeve 216 has a cam edge 236 (Fig. 17) with which the arm 220 engages when it is swung about the axis of shaft 215. In non-indicating positions the indicator will be substantially at right angles to the position shown in Fig. 15 with the arm 220 resting upon the upper edge 237 of the sleeve 216. In this position the indicator is at one side of the record and the roller mechanism is elevated within the housing 214.

While the tilting of the record by the discard head will cause the table to roll the inclined record around the point of support in the discard head and discard it off of the edge of the right-hand side of the table into a hopper (not shown) beneath the table, I use a discard arm 219' to aid in the movement. This discard arm is secured to the indicator housing 214 and carries at its free end a pin 220'. When the indicator mechanism is being moved to the position shown in Fig. 15 the pin 220' is brought into engagement with the tilted record (described in detail later) and forcibly slides it off the table into the hopper.

On the lower end of the shaft 215 is fastened finger 263, a plan view of which is shown in Fig. 5. This finger is rotated by cam 93 fastened in the standards 92 by screws 94.

The cam and finger rotate the shaft 215 counterclockwise, as shown in Fig. 5, and a spring 265 rotates the shaft in the opposite direction. This spring has one end fastened to the shaft and the other end fastened to pin 267 secured in the plate 17.

To prevent records from being rejected and thus provide for continual playing of the same record, repeat lever 268 is pivoted to the plate 17 at 269 and one end 270 is upturned through a slot 271 (Fig. 4) to be grasped by the operator for this purpose. The repeat lever 268 extends downwards at 272, and then at right angles at 273 and again downwards at 274. When the finger 270 is moved counterclockwise, as shown in Fig. 4, the end 273 passes beneath the lower parallel link 67 and prevents the discard standard 76 from being lowered when the end of the lift lever 52 is lowered by the lift lever pin or roller passing along the cam surface 156 and 157 (Fig. 7).

On the shaft 2 of the motor 1 is arranged a three-ball governor 275 and a friction plate 276 fastened to a collar 278 to which the three spring strips of the balls are secured. This collar together with the friction plate 276 is adapted to slide along the motor shaft 2 when the balls are thrown outward by centrifugal force. A leg 279 is pivoted at 280 and extends through the top plate 17 where it is adapted to be engaged by pin 281 fastened in a rotatable rod 282 fastened in a control lever 283 located above the plate 17. This control lever has a knob 284 to be grasped by the operator for regulating the speed of the motor. A spring 285 extends between a pin on the lower end of the rod 282 and the upper side 286 of the bracket. A spring 287 having one end fastened around screw 280 and the other end extending around lever 279 tends to force this lever and the friction lug 288 away from the friction disk. When the adjusting knob 284 is moved counterclockwise in Fig. 4 the pin 281 moves the lever 279 and brings the friction lug 288 closely to the friction plate 276. This will cause the friction plate to engage the lug at a lower speed and slow down the motor. Movement of the knob 284 in a clockwise direction in Fig. 4 will permit the spring 287 to move the lever and lug 288 further away from the friction disk 276 and thus cause the motor to run at a higher speed. The purpose of spring 285 on the rod 282 is to furnish sufficient friction to hold the lever 279 in adjusted position in opposition to the tension of spring 287 and the thrust of the friction disk 276.

The pick-up 289 may be of any standard construction, various forms of which are in use. This pick-up is journalled between ears 290 of the pick-up arm 176 on pin 291. A set screw 292 is threaded through one of the ears 290 and enters a hole in the arm 293 of the pick-up. By unscrewing the set screw the pick-up may be rotated around its pivot to enable one to insert a needle. After the change the pick-up is rotated back again and the set screw turned home again. A two stranded conductor 294 passes from the magnet of the pick-up down through the pick-up arm to be appropriately connected to vacuum tubes, amplifiers and loud speaker, not shown.

The operation of the device will now be described:

The control switch on the panel board of the instrument (not shown) will be thrown to the operating position and the pick-up arm 176 raised and moved until the cam follower 183 rests on the bracket 191. This will remove pressure from the switch contact strip 203 and permit contacts 202 and 204 to close. The motor will now start to revolve, rotating the turntable through shaft 5. The cam 9 however, will not rotate as the clutch is in the open position shown in Fig. 11. The operator will place a plurality of records either all of small size, all of large size or a promiscuous arrangement of large and small size records on the turntable pin 9'.

The needle will not yet be placed in the groove of the top record on the rotating turntable because the mechanism would not be set to indicate whether it is a large or a small record. To cause this mechanism to operate, the pick-up arm is moved, with the needle free of the record, to the center. Trip dog 174 then engages the downturned projection 49 on the trip lever 36 and raises the end of the lever thus freeing the catch 34, 35. The operator could also have started this indicating mechanism into operation by moving the pick-up arm free of the record towards the center and then back again. As the pick-up arm is moved towards the center the trip dog 175 (Fig. 2) slides along over the serrations in the ledge 48 of trip lever 36, but when the pick-up arm is swung outwardly the point of the dog 175 enters one of the serrations and further outward movement of the pick-up arm causes the dog 175 to raise trip lever 36 and thus frees the catch 34, 35. This movement of the dogs is of course brought about by movement of the pawl arm 169 which is fastened to the pick-up post or pawl arm 169 which is fastened to the pick-up post or standard 162 which is connected to the pick-up arm 176 (Fig. 11).

When either of the dogs trips the throw-out lever 31 spring 39 and gravity pulls both the throw-out lever and the clutch lever 42 downwards in Fig. 10, thus bringing the clutch member 25 into contact with the clutch on gear 6. Gear 6 then rotates and turns the cam 9 through the idler gear 7. The rotation of cam 9 clockwise in Fig. 5 brings the end of finger 263 clear of the point 295 so that it moves clockwise in Fig. 5. This movement of shaft 215 slides the arm 220 off of the high point 237 on the sleeve and permits it to slide down the cam surface 236. The amount of movement down the cam 236 will depend upon the number of records on the table.

Figure 14:
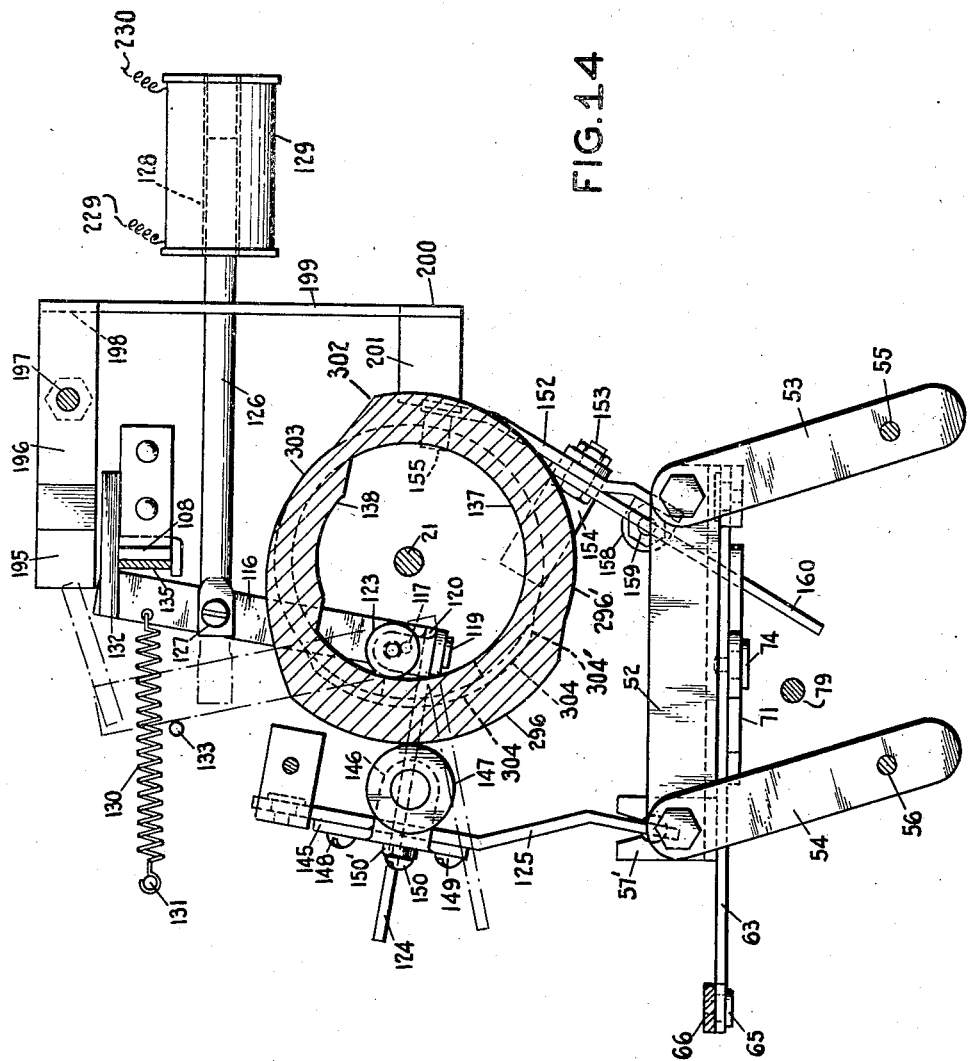
Fig. 14 is a sectional plan showing the record changing apparatus and cam mechanism, to show its coaction with certain parts.

The indicator mechanism is thus brought over the records and the roller mechanism dropped until roller 224 rests on the top record. If the top record happens to be of large size as shown in Fig. 15, the roller 234 will also engage the record and swing arm 234 until contact bar 226 electrically joins the two contacts 226 and 227 and completes the circuit through solenoid 129 (Fig. 14). Energization of solenoid 129 causes armature 126 to be moved to the right. This moves lever 116 about its pivot and swings arm 124 under the surface 136 of arm 125. Soon after this happens roller 123 engages cam surface 138 on the inside of cam 9. This forces the bell crank lever 120 to rotate counterclockwise (Fig. 15) and raises the end 124. The end 124 then engages surface 136 on arm 125 and further movement of the bell crank 120 slides the left-hand end of this arm 125 upwardly. Slot 139 permits this. This brings roller 147 into engagement with the upper track on cam 9 which contains cam surface 296 (Fig. 14). When armature 126 was moved it also brought bar 132 into engagement with lever arm 135 of the switch cam 107, raising the cam surface 111 (Figs. 5 and 15) so that it will engage the operating pin 106 of the track switch 103 of Fig. 7. This connects the groove 104 with groove 101 by means of groove 104'. Follower arm 183 on the pick-up arm is raised upwardly by the slanting surface 96 of rotating cam 9 until the depending lug 187 is deposited in the groove 101 commencing at the point 102. The cam follower and pick-up arm are still further raised by the cam surface 100 raising the needle still further off the record. The depending lug 187 of the cam follower is finally led into groove 104' of the track switch 103 which had been previously thrown, as described, and finally passed into groove 104. This final movement of the pick-up arm by the groove 104 positions the needle adjacent the beginning of the sound groove of the large size record and as the cam follower slides down the sloping surface of groove 104 the needle is deposited on the record in the right position from which it is soon drawn into the sound groove.

If the top record had been of small size the outer edge would have been at the point 238 and roller 232 would not have been engaged. Switch arm 233 would not have been elevated to close the contacts and the solenoid would not have been energized to move cam switch lever 107. In this case the track switch would have remained in the position shown in Fig. 6. The cam follower lug 187 would then have passed through groove 101' into the end of groove 101. This would have positioned the needle for a small size record.

Returning to the movement of the cam 9 prior to the placing of the needle in the record track, the discard mechanism operated by the roller 155 on arm 152 (Figs. 7 and 14) did not rise by weight of the parts resting on lever 160 (Fig. 12) because projection 201 of the discard holdup is held over the arm 152. When the cam surface 156, 157, came over the roller the discard mechanism did not operate to discard this first record as it would have done if the pick-up arm had not been held in elevated position by support 194. After the cam surface 157 had passed the roller on arm 152 projection 47 engaged the portion 199 of the discard holdup and forced it to turn about its pivot 197, thus removing end 201 from over the roller arm 152. This discard holdup will not again be brought into action until the pick-up arm is hung up again and a new supply of records added, as already described.

When the cam 9 was rotated to its final position the arm 47 engaged the slanting surface 41, 44' (Fig. 11) of lever arms 31 and 42 which thus forced the lever arm 31 upwardly and put added tension on spring 39 to lift the clutch lever 42 upwardly, but at this time the projection 47 prevented the clutch lever from being lifted. The lifting of arm 31 permits gravity to cause arm 36 to move to position the catch 35 beneath its seat 34, thus resetting the trip mechanism. As soon as the cam 47 clears the ends of levers 31 and 42 the spring 39 snaps the ends 42 of the clutch lever upwardly until it engages the standard 42' of the throw-out lever 31. This snap action throws out the clutch engagement between members 6 and 25. At this time the cam stops rotating due to the clutch action.

The needle having been placed in the groove of a large size record is trailed along in the usual way towards the center of the record. The vibration of the needle by the sound groove will induce currents in the pick-up in a well understood way. These currents pass through the connectors 294 to vacuum tube amplifiers and a loud speaker, not shown, as they may be of standard construction. When the record is completed the needle will be led into the discard groove at the center.

There are two standard forms of grooves in use, one being a spiral groove leading directly towards the center of the record and the other being an eccentric circle. Assuming that the spiral groove is on this record, the needle will be drawn quickly towards the center. During the playing of the record the pick-up arm moved the bearing bracket 162 and arm 169 attached thereto, thus drawing trip dog 174 along under the trip lever 36. The final movement of the pick-up arm due to the spiral groove above referred to quickly brings dog 174 into engagement with projection 49. This raises the trip lever 36 and frees the catch 35 from the seat 34. This action causes the clutch member 25 to engage the clutch part on gear 6. The engagement of these two gears causes the cam 9 to rotate, as previously described. At the start of this rotation of the cam 9 the roller on lift lever 152 (Fig. 7) is positioned at the beginning of cam 156. Therefore, the first thing accomplished by the rotation of the cam is the lowering of the discard head for rejection of the record already played. This is brought about by the weight of the parts connected to the reject standard 66 (Fig. 13), the holdup 201 being now out of position. The discard standard 66 descends quickly until roller 89 rests on top of the record.

At this time it should be said that the discard standard 66 will be moved to the right in Fig. 14 the correct distance for a large size record because the indicator operation previously completed before the playing started, caused roller 147 to ride up on cam surface 296 of cam 9. The roller retained this position through friction even though solenoid 129 was deenergized before the record started playing.

The cam surface 296 moves the roller 147 and arm 125 outwardly. This movement of arm 125 moves link yoke 51 through the universal joint connection. As link yoke 51 is moved to the right in Fig. 13, arms 63 and 67 move outwardly. This outward movement of arms 63 and 67 moves the standard 66 sufficiently to the right to permit the roller 89 to rest near the edge of the large record with the disk 81 just outside of and below the edge. At about this time roller 147 reaches the end of cam surface 296 (Fig. 14). Link yoke 57 and the connected parallel arms 63, 67 (Fig. 12) are no longer held out by this roller. Spring 76 then snaps these arms quickly inward until the roller 147 moves to the lower surface 296' of cam 9. This movement of the parts slides the roller 89 over the top of the record and the edge of the disk 81 under the record. Soon after this operation takes place discard roller 155 travels up on cam surface 157 (Fig. 7) raising the discard arm 160 about the pivot 153. This movement of the arm 160 raises the discard standard 66 by contact with member 71. As standard 66 rises the record held between the roller 89 and the disk 81 is raised sufficiently for the top record 300 to clear the turntable pin 9'. The discard standard 220' on the arm 219' is moved against the edge of the tilted record (Fig. 13) as the indicator head is being quickly rotated and lowered by spring 265 at this time to indicate the next record. The standard 220' thus kicks the tilted record from the turntable into the hopper (not shown). Prior to the tilting of the record the pick-up arm 176 was swung clear of the record by engagement of projection 187 on cam follower 183 with the web 99 which guided the projection into groove 101. Just before the time the discard head 80 was raised to tilt the record the cam follower rode up on the ridge 100. On account of these movements the pick-up arm is not engaged by the discard pin 220' during discard.

As the cam continues to rotate after the record has been discarded the point 295 of cam 93 (Fig. 5) clears the end of finger 263 and it quickly snaps over into position against projecting arm 264. This movement of the finger 263 drops the indicator mechanism of Fig. 15 onto the top record by means already described. Let it be assumed that this record is of small size. Roller 224 will then contact with the small record, the edge being at point 238, but roller 232 will be free of the record. The gravity of this roller and connected switch parts will cause the switch to remain in open position. Solenoid 129 will therefore not be energized. This leaves lever 116 as shown in dotted lines in Fig. 14. As the cam 9 continues to rotate the roller 147 finally reaches point 302 on cam surface 296 where it quickly descends towards surface 303. At this point the arm 54 engages the stop pin 79 in the top plate 17. When the arm is in contact with the pin roller 147 has a slight clearance with surface 303 of cam 9. The weight of lever 125 and connected parts then rotates about the universal joint 151 and drops down sufficiently for the roller 147 to lie in the plane of cam surface 304. The slot 139 at the left-hand end of arm 125 in Fig. 12 permits this. In this position bell crank lever 124 is beneath the edge 134.

Continued rotation of the cam 9 will bring the roller 123 into contact with the inner cam surface 138 thus raising the bell crank end 124. This will not raise lever 125 as it is not under the edge 136. Roller 147 therefore remains in position to follow cam surface 304 rather than cam surface 296. Shortly after the indicator mechanism was dropped on to the topmost record the projection 187 on cam follower 183 had been brought adjacent the track switch 103. Since a small size record was on top of the supply on the turntable and solenoid 129 was not energized, this track switch was held in the position shown in Fig. 6 by spring 112. The projection on the cam follower therefore continues through groove 101' and on through groove 101 instead of groove 104. The cam follower was not moved from the position shown in Fig. 6 because the switch cam 107 lies below the projection 106 when solenoid 129 is deenergized.

As the cam continues to rotate the cam follower is brought quickly down the end of the groove 101 and the clutch opens, as previously described. The needle is then placed on the small size record adjacent the beginning of the sound grooves where it is drawn into position and the record is played. When the needle is drawn to the end of the groove of this record it will either pass into the spiral discard groove or the eccentric groove, whichever is used, so that either the dog 174 or dog 175 will trip the trip lever 36 and start the discard operations over again.

The roller 155 rides up surface 156 and roller 147 rides up cam surface 304. This brings the discard head down with the disk 81 adjacent the edge of the small size record. When the roller 147 reaches the point 304' the spring 76 draws the disk under the record which is raised and discarded in the way already described.

The discard and pick-up mechanism are normally set for small size records. When the indicator mechanism drops on to the top record the normal arrangement is not disturbed if that record is of small size. If it is of large size the indicator sets the discard and the pick-up mechanism for a record of large size. The mechanism automatically returns to the position for small size records just before the cam stops, independently of the indicator mechanism. The indicator mechanism acts solely to change the normal position to that required for large size records.

The phonograph will continue automatically to play the records, either small or large, until the last one has been played and discarded from the turntable. Then as the cam follower brings the pick-up arm back to the playing position there will be no record on which the needle can rest. The pick-up arm will therefore drop down until the cam follower engages the channel bar 210 (Fig. 17) and opens the switch 202, 203. The motor will then stop as this switch is in the motor circuit. To continue the playing it will be necessary to remove the records from the discard hopper and place them on top of the turntable as previously described.

If any record is to be repeated the end 270 of the repeat lever is moved to bring ledge 273 beneath discard link 67 (Fig. 12) thus preventing the discard head from lowering to reject the record. The indicator will continually set the mechanism for playing this record until the repeat lever is moved back again.

In Figs. 23, 24, 25, I have shown a modification to hold the tilted record during the discard of the record therebeneath so that there can be no possibility of scratching such record when the tilted record is kicked off the table into the hopper. At the right-hand side of the apparatus, as shown in Fig. 12, I secure a protector rail 305 in the top plate 17. This rail has one end 306 extending through the top plate at one side of and slightly below the turntable 8'. The rail then extends substantially parallel to the turntable in an outwardly direction to the point 307. It then curves approximately concentric to the turntable while sloping upwardly to the point 308. This portion of the rail is preferably covered with felt or some other soft material 309 that will not scratch the record. At the point 308 the rail extends downwardly through the plate 17 and is secured thereunto by appropriate threaded nuts. Bracket 310 has a short ear 311 pivoted on rail 305 near the point 308 and the longer ear 312 pivoted on the extension 313 of this rail and resting on nut 314. To this bracket 311 is secured a second rail 315 having a portion 316 bent at right angles and covered with a layer 317 of felt or other appropriate material.

The long ear 312 has a pin 318 fitting in a slot 319 of the link 320 pivoted at 321 to an arm 322 riveted or otherwise secured to the arm 53.

A spring 323 encircles the extension 313. This spring is fastened at one end to the extension 313 and the other end 324 passes behind the ear 312 (Fig. 25) so as to rotate the rail 316 in a clockwise direction in Fig. 23. This spring holds the rail 317 approximately over the rail 305 except when the end 325 of the slot 319 engages pin 318 to pull it inwardly. The position of the parts is such that when a 12 inch record is being discarded the movement of the parallel arms 53, 54, as previously described, will not move to the left in Fig. 26 sufficiently far to move the rail 317 counterclockwise, but when the arms 53, 54, move inwardly to discard the 10 inch record link 320 is moved sufficiently to pull the rail 317 inwardly under a 10 inch record. When a 12 inch record is to be discarded the parallel arms 53, 54, move to the right in Fig. 26, as previously described and permit the spring 323 to move outwardly away from the turntable.

When a record is tilted for discard the rotation of the turntable starts the bottom of the inclined record up on the rail 305 if it is a 12 inch record and the discard pin 220' kicks the record into the hopper. In this action it slides on the felt covered rail and does not further contact with the record therebeneath. If it is a 10 inch or small size record the record is kicked off in contact with the bottom part 307 of the rail and with the rail 317 which at this time is pulled inwardly.

Having described my invention, what I claim is:

1. In phonographs, a table adapted to carry a record, a discard head, means to lower the discard head to engage the record, means to move the discard head, while thus engaged, inwardly against the edge of the record, and means to raise said head to tilt the record.

2. In phonographs, a turntable fixed in a horizontal plane, means to rotate said table, means for tilting the record on said table to discard it therefrom, and a rest at one side of the turntable slanting from beneath the turntable to a position above said horizontal plane whereby the rotating table causes the record to be moved upwardly along said rest while being discarded, and means to force the record over said rest.

3. In phonographs, a turntable adapted to contain superposed records, a discard rest adjacent one side of the table and extending above the plane of the topmost record, and means to force the topmost record over said rest out of contact with the next succeeding record.

4. In phonographs, a turntable adapted to contain superposed records, a discard rest adjacent one side of the records and slanting upwards from a point opposite the lower surface of the bottom record to a point opposite and above the upper surface of the top record, means to tilt the top record whereby the turntable may force it over the said rest out of contact with the next succeeding record.

5. In phonographs, a turntable adapted to contain superposed records, means to rotate the table, a discard rest adjacent one side of the table and inclined upwards in the direction of the rotation of the table and means cooperating with said turntable to force the topmost record over the discard rest.

6. In phonographs, a turntable adapted to contain superposed records, means to rotate the table, a discard rest adjacent one side of the table and inclined upwards in the direction of the rotation of the table, and means to raise the edge of the topmost record whereby the rotating table starts the record up the inclined rest.

7. In phonographs, a record table adapted to contain a plurality of superposed records, a discard head having a wedge normally positioned above the topmost record, means for lowering said head until the said wedge is opposite the lower edge of the topmost record, means for forcing the wedge under the said record, and means for raising the head to tilt the record until it is free of the center pin.

8. In phonographs, a record table adapted to contain a plurality of superposed records, a discard head having a wedge, means for forcing the wedge beneath the record and raising it upwards to clear the center pin, and means to engage the record, remote from the head, to force the record off of the turntable.

9. In phonographs, a record table adapted to contain a plurality of superposed records, a discard head having a wedge, means for lowering the head until the wedge is opposite the lower edge of the topmost record, means for forcing the wedge under the said record, means for raising the head to tilt the record free of the center pin, and means to engage the record remote from its support by the head to force it off the table.

10. In phonographs, a turntable adapted to hold records thereon, a discard head adapted to clasp the edge of the topmost record on said table, a rotatable cam having a cam surface, a cam follower engaging said surface to move the discard head outwards in position to clear the edge of a small size record, said cam having a second cam surface and indicating means cooperating with the topmost record adapted to cause said follower to contact with said second cam surface to move the discard head free of the edge of a large size record when a record of such size is topmost on the turntable.

11. In phonographs, a turntable, a discard device for records on the table, a rotatable cam having two main cam surfaces and an auxiliary cam surface, a cam follower connected to the discard device, and a cam follower contacting with the auxiliary cam surface to move the first mentioned cam follower from one main cam surface to the other.

12. In phonographs, a turntable, a discard device for records on the table, a rotatable cam having two main cam surfaces and an auxiliary cam surface, a lever pivoted at one end and connected at the other to said discard device, a cam follower on said lever, a bell crank lever having a cam follower on one end engaging the auxiliary cam surface, the other end of the bell crank lever being normally free of the first mentioned lever, and means to shift the end of the bell crank lever to engage the first mentioned lever and shift the first mentioned cam follower from one main cam surface to the other.

13. In phonographs, a turntable adapted to hold small and large size records thereon, a discard head adapted to clasp the edge of the topmost record on said table, a rotatable cam having three cam surfaces, a lever attached to said head and having a cam follower adapted to engage either of two of said cam surfaces to move the head outwardly for small and large size records, and a lever having a cam follower engaging the third cam surface adapted to shift the first mentioned follower from one of the cooperating cam surfaces to the other.

14. In phonographs, a turntable fixed in a horizontal plane, means to rotate said table, means for tilting the record on said table to discard it therefrom, and a rest at one side of the turntable slanting from beneath the turntable to a position above said horizontal plane, whereby the rotating table causes the record to be moved upwardly along said rest while being discarded.

15. In phonographs, a turntable, means for tilting the record from the table when played and a record rest moved by said means toward the turntable.

16. In phonographs, a turntable adapted to contain large and small records, means for tilting the record on said table to discard it therefrom and a rest at one side of the turntable slanting from the turntable to a position thereabove, whereby the rotating table causes the record to be moved onto said rest while being discarded, a second rest positioned to move toward and from said table, and means to move said second rest toward the turntable when the record to be discarded is of small size.

17. In phonographs, a pick-up, a turntable, a cam having two grooves therein and spaced unequally from the center of the cam, an arm attached to the pick-up and having a lug thereon, a track switch, an indicator adapted to engage the record adjacent its edge and cause said switch to lead the said lug into the outer groove when the record to be played is of large size and means to cause said indicator to engage said record.

18. In phonographs, a pick-up, a turntable, a cam having two grooves therein and spaced unequally from the center of the cam, an arm attached to the pick-up and having a lug thereon, a track switch normally connected with the inner groove, an indicator adapted to engage the record adjacent its edge and cause said switch to lead the said lug into the outer groove when the record to be played is of large size and means to cause said indicator to engage said record.

19. In phonographs, a turntable adapted to hold large and small records, an indicator having a frame mounted to move at right angles to the records, a roller journalled on said frame and adapted to contact with the topmost record, a second roller pivoted to swing relatively to said frame and positioned to avoid contact with small records but to contact with large records, and a switch operated by the second roller.

20. In phonographs, a turntable adapted to hold records thereon, a discard head, means to move said discard head for discarding the topmost record from the turntable, an indicator adapted to engage the next record therebelow to cause the said head to move radially outward beyond the edge thereof and means to move the indicator into engagement with the last mentioned record.

21. In phonographs, a turntable adapted to hold records thereon, a discard head for discarding records from the turntable, means for moving said head away from the center of the records, and means contacting with a record for controlling the distance the discard head moves.

22. In phonographs, a turntable adapted to hold records thereon, a discard head for discarding records from the table, means to move said head outward in position to engage a small size record, means to move the said head outwards in position to engage a large size record and an indicator adapted to engage the next record to be played to select the proper means to move the head.

23. In phonographs, a turntable adapted to hold records thereon, a discard head for discarding records from the table, a cam surface for moving the said head to position it for engaging a small size record, a cam surface for moving the said head to position it for engaging a large size record, and an indicator adapted to engage the record to be discarded to select the cam surface to operate the said head.

24. In phonographs, a pick-up, a turntable adapted to hold large and small records, an indicator having means to swing against the next record to be played, and an arm attached to said indicator to engage the played record and discard it from the turntable and means controlled by the indicator to move the pick-up to playing position of the next record.

25. In phonographs, a turntable adapted to hold a stack of superposed large and small records, an indicator adapted to swing over and rest upon the next record to be played, means attached to said indicator to engage and remove the previously played record and means controlled by the indicator to move the pick-up to playing position of the next record.

26. In phonographs, a turntable adapted to hold a stack of superposed records of large and small size, means for tilting the played record above the table, and an indicator mounted to swing beneath the tilted record and rest on the topmost unplayed record to set the phonograph for playing a record of that size, means on said indicator to engage the tilted record to force it off the turntable.

27. In a phonograph, a pick-up, a turntable, a cam having two grooves spaced unequally from the center of the cam, a third groove in said cam and a track switch normally biased to connect the third groove with the inner one of the first mentioned two grooves, means to move the said track switch to connect the third groove with the outer one of the first mentioned two grooves, and means fitting in said grooves to move the pick-up over the turntable.

28. In a phonograph, a pick-up, a turntable, a cam having a plurality of grooves to operate said pick-up, a track switch pivoted in said cam, a projection on said track switch, an operating member normally free of said projection and means to move said member to engage the projection.

29. In a phonograph, a cam member having a main track and two auxiliary tracks, a switch member, one of said members having a pivot pin and the other a pivot hole fitting thereover, a spring adapted to retain the pivot pin in said hole and to swing the switch member about the center of the pivot pin and connect the main track with one of said auxiliary tracks.

30. In a phonograph, a cam member having a main track and two auxiliary tracks, and a switch member connecting the main track with said auxiliary track, one of said members having a pivot pin and the other a pivot hole, one of said members having a lug and the other a spring, said spring engaging said lug normally to prevent removal of the switch member and to swing it around the center of the pin.

31. In phonographs, a motor, a rotatable member, a pick-up arm adapted to be moved by said member, a clutch between the motor and the member, a pivoted lever engaging the movable member of the clutch, a second pivoted lever extending substantially in the plane of, and overlapping the first lever, a spring tending to pull said levers into engagement, a trip lever adapted to engage the second lever and hold the clutch open by means of said spring, and means operated by said pick-up to disengage said trip lever and cause the first mentioned lever to close the clutch.

32. In phonographs, a motor, a rotatable member, a pick-up arm adapted to be moved by the member, a clutch between the motor and member, a pivoted lever engaging the movable part of the clutch, a second pivoted lever overlapping the first lever, a spring tending to pull said levers into engagement, a trip lever adapted to engage the second lever and hold the clutch open by means of said spring, and means operated by said pick-up to disengage said trip lever and cause the first mentioned lever to close the clutch, and means on said member to raise the second mentioned lever to engage it with the trip lever.

33. In phonographs, a table adapted to contain a record, a discard head, means to move said head radially toward the record to engage beneath the edge thereof, a cam, a pivoted lever engaging said head with one end and said cam with the other, and hand operated means to prevent said lever from following said cam when the record is to be repeated.

34. In phonographs, a table adapted to contain a record, a discard head adapted to engage the edge of a record, a cam, a pivoted lever engaging said head with one end and said cam with the other and hand operated means to prevent said lever from following said cam when the record is to be repeated, and means on said cam to free said lever from control by said hand operated means.

35. In phonographs, a table adapted to contain a record, a discard head, means to move the discard head to engage the edge of a record, a pick-up, a rest to support the pick-up at one side of the turntable when manually placed thereon for supplying records to the turntable, and means operated by said pick-up as it is being placed on the rest for preventing said means from moving said head to engage the edge of a record on the turntable.

36. In phonographs, a pick-up, a turntable adapted to contain superposed records of small and large sizes, means to tilt a played record on the turntable, means to move the pick-up to the beginning of the sound track of the record next below said tilted record, an indicator adapted to cause the second mentioned means to move the pick-up either of two distances, and means to lower the indicator beneath the tilted record and onto the record next therebelow.

ARTHUR B. WINCHELL.